United States Patent
Sandahi (10) Patent No.: US 11,571,642 B2
(45) Date of Patent: Feb. 7, 2023

(54) SELF CLEANING WATER FILTER UNIT

(71) Applicant: Jeffrey Sandahi, Corcoran, MN (US)

(72) Inventor: Jeffrey Sandahi, Corcoran, MN (US)

(*) Notice: Subject to any disclaimer, the term of this patent is extended or adjusted under 35 U.S.C. 154(b) by 0 days.

(21) Appl. No.: 15/977,687

(22) Filed: May 11, 2018

(65) Prior Publication Data
US 2018/0326327 A1 Nov. 15, 2018

Related U.S. Application Data

(60) Provisional application No. 62/504,950, filed on May 11, 2017.

(51) Int. Cl.
| | | |
|---|---|---|
| C02F 1/00 | (2006.01) |
| B01D 29/33 | (2006.01) |
| B01D 61/08 | (2006.01) |
| B01D 63/02 | (2006.01) |
| B01D 29/11 | (2006.01) |
| C02F 1/44 | (2006.01) |
| B01D 65/02 | (2006.01) |
| B01D 61/02 | (2006.01) |
| C02F 1/28 | (2006.01) |
| B01D 29/58 | (2006.01) |
| B01D 35/04 | (2006.01) |
| B01D 71/02 | (2006.01) |
| B01D 71/48 | (2006.01) |
| B01D 71/52 | (2006.01) |

(52) U.S. Cl.
CPC ............ *B01D 29/117* (2013.01); *B01D 29/33* (2013.01); *B01D 29/58* (2013.01); *B01D 35/04* (2013.01); *B01D 61/025* (2013.01); *B01D 61/08* (2013.01); *B01D 63/02* (2013.01); *B01D 65/02* (2013.01); *C02F 1/003* (2013.01); *C02F 1/28* (2013.01); *C02F 1/283* (2013.01); *C02F 1/441* (2013.01); *B01D 71/021* (2013.01); *B01D 71/48* (2013.01); *B01D 71/52* (2013.01); *B01D 2311/06* (2013.01); *B01D 2311/2626* (2013.01); *B01D 2321/02* (2013.01); *C02F 2201/006* (2013.01); *C02F 2307/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,218,317 A | * | 8/1980 | Kirschmann | B01D 61/08 210/133 |
| 4,711,723 A | * | 12/1987 | Bray | B01D 61/08 210/261 |
| 5,037,547 A | * | 8/1991 | Burrows | B01D 61/08 210/232 |
| 5,164,085 A | | 11/1992 | Spokoiny et al. | |
| 6,325,929 B1 | | 12/2001 | Bassett | |
| 6,800,200 B2 | | 10/2004 | Bassett et al. | |
| 7,081,201 B2 | * | 7/2006 | Bassett | B01D 27/06 210/315 |
| 7,422,690 B2 | * | 9/2008 | Scharstuhl | B01D 61/16 210/257.2 |

(Continued)

*Primary Examiner* — Hayden Brewster
(74) *Attorney, Agent, or Firm* — Larkin Hoffman Daly & Lindgren, Ltd.; Todd R. Fronek (57) ABSTRACT

A filter unit includes an inlet for receiving unfiltered water. A first fluid path directs water through a membrane and a filter element to a first outlet. Additionally, a second fluid path directs water across the membrane and to a second outlet.

19 Claims, 10 Drawing Sheets

(56) References Cited

U.S. PATENT DOCUMENTS

| | | |
|---|---|---|
| 2005/0040097 A1 | 2/2005 | Bassett et al. |
| 2006/0175270 A1* | 8/2006 | Greene .................. B01D 29/66 210/798 |
| 2006/0213821 A1* | 9/2006 | Choi ...................... B01D 65/00 210/136 |
| 2014/0110331 A1 | 4/2014 | Baird |

* cited by examiner

Section A-A

SELF CLEANING WATER FILTER UNIT

BACKGROUND

Current household and industrial water filtration systems generally produce two water streams for two types of uses. A first water stream of filtered water is used for drinking and cooking, whereas a second stream of unfiltered water is used for general purposes, such as washing hands and cleaning dishes. In some current systems, in order to produce filtered water, water is diverted from an unfiltered source and sent to a filter housing to create a filtered water stream. Unfiltered water bypasses the filter and continues directly to a faucet to deliver an unfiltered water stream.

Current filter housings include a filter element or cartridge designed to remove contaminants in the unfiltered water and deliver filtered water. After a faucet (or other valve) associated with the second stream is shut off, removed contaminants from the second stream remain embedded in the filter element. When the filtered stream is not utilized, water stagnates within the housing. Additionally, contaminants remain embedded in the filter element, creating further stagnation.

Current Reverse Osmosis (RO) systems include one or more filter elements and a membrane downstream from the filter elements. Downstream from the membrane is a filtered line leading to a tank and a waste line that leads to a drain. Due to the high amount of pressure and slow speed of water production in RO systems, water is stored in the tank at room temperature, causing it to stagnate prior to use.

SUMMARY

A filter unit includes an inlet for receiving unfiltered water. A first fluid path directs water through a membrane and a filter element to a first outlet. Additionally, a second fluid path directs water across the membrane and to a second outlet. In one aspect, a method includes directing water through the first fluid path to produce a filtered water stream when a first valve is open and directing water through the second fluid path to produce a flushed water stream when a second valve is open.

DETAILED DESCRIPTION

Figure 1A:
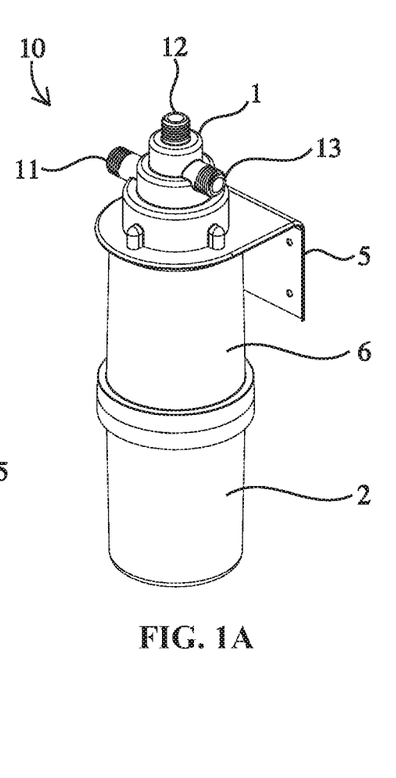
FIG. 1A is a perspective view of a filter unit.
Figure 1B:
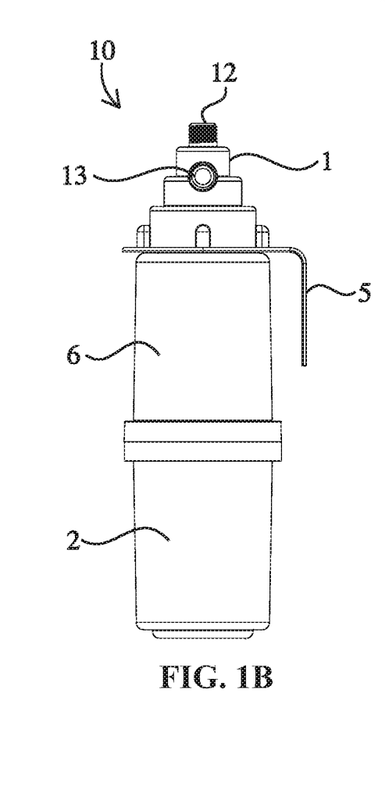
FIG. 1B is a side view of the filter unit of FIG. 1A.
Figure 1C:
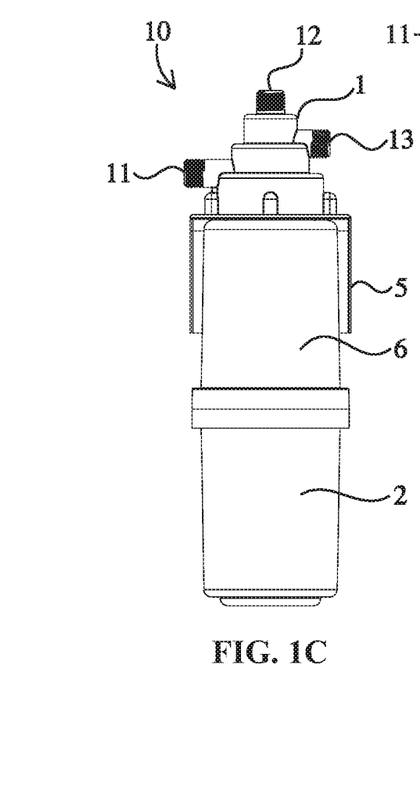
FIG. 1C is a front view of the filter unit of FIG. 1A.
Figure 1D:
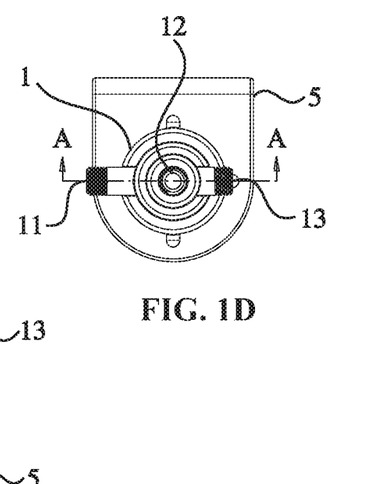
FIG. 1D is a top view of the filter unit of FIG. 1A.
Figure 2A:
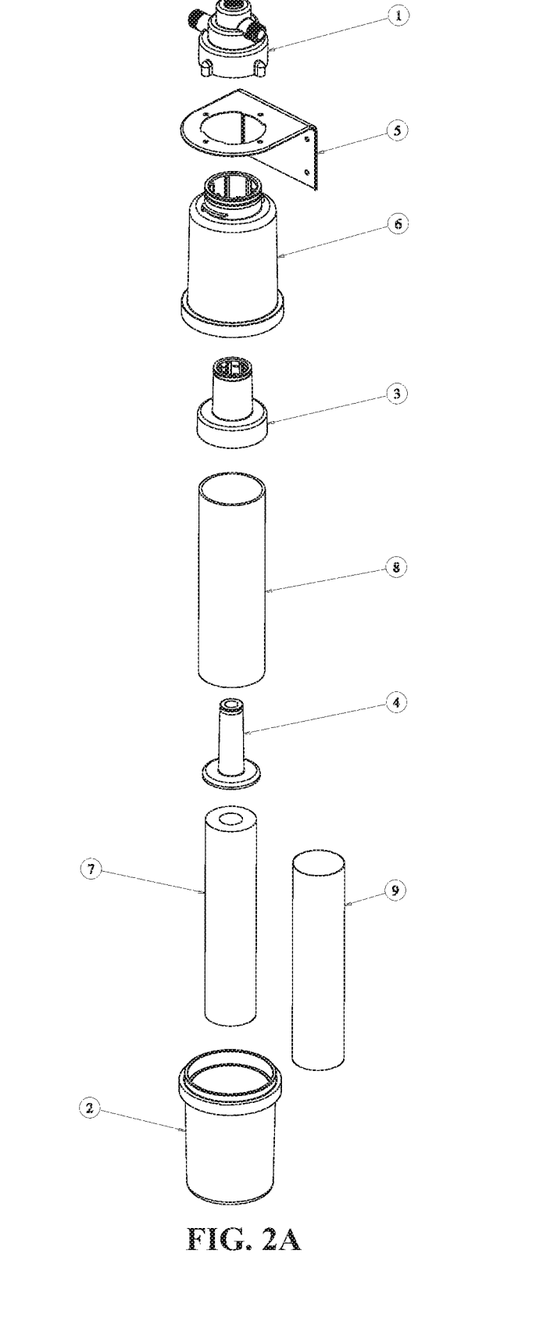
FIG. 2A is an exploded perspective view of the filter unit of FIG. 1A.
Figure 2B:
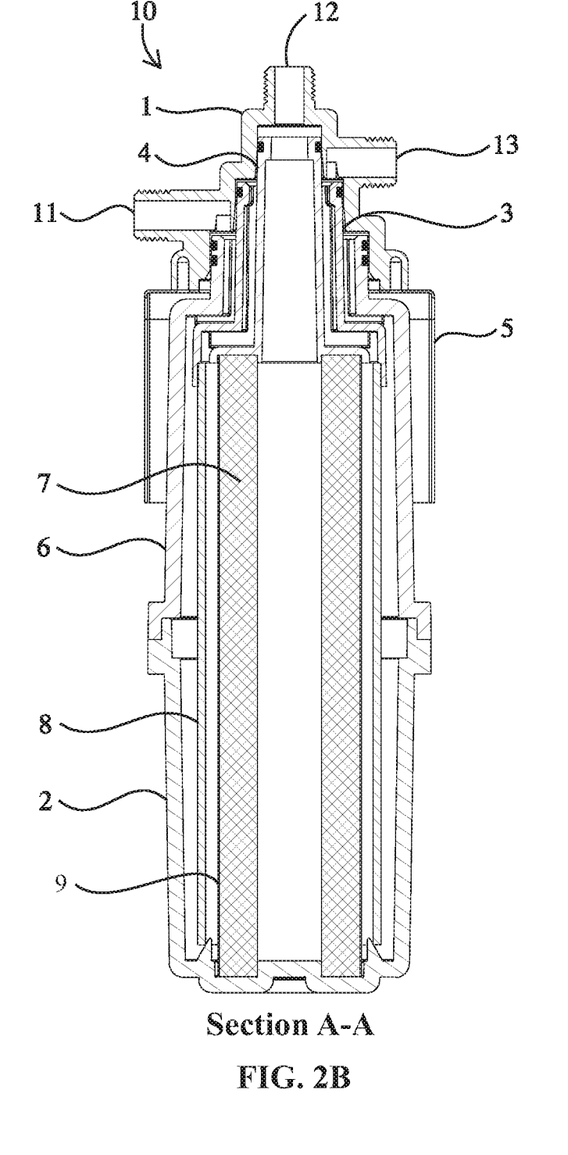
FIG. 2B is a sectional view of the filter unit of FIG. 1A taken along the line A-A in FIG. 1D.
Figure 3:
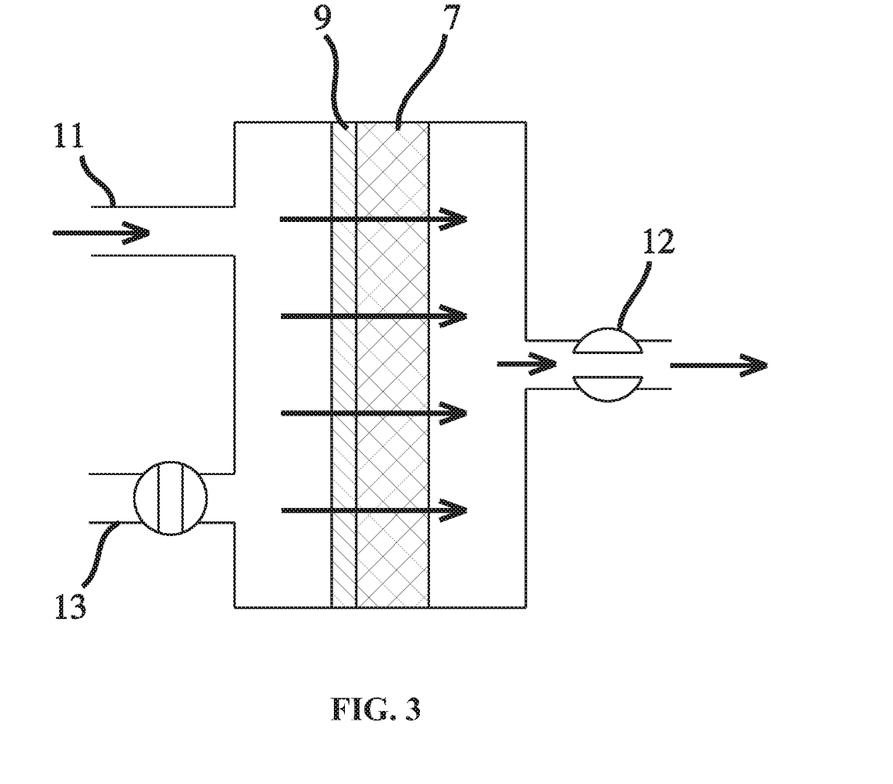
FIG. 3 is a schematic view of a filter unit operating in a first, filtering mode.
Figure 4:
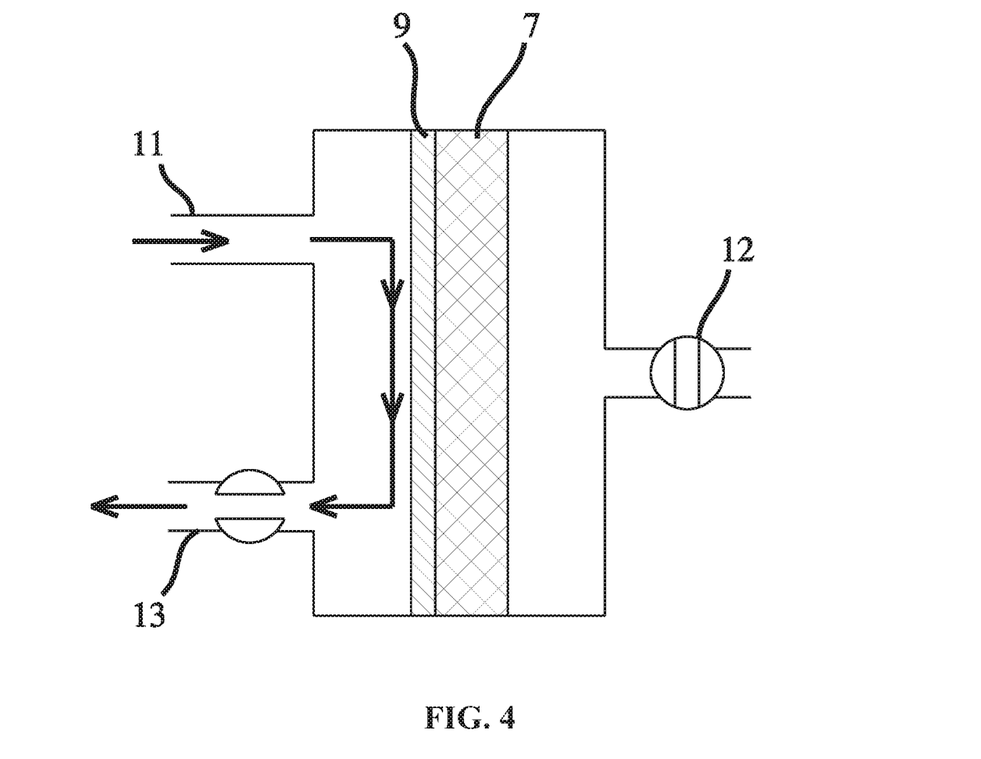
FIG. 4 is a schematic view of a filter unit operating in a second, flushing mode.

FIGS. 1A-1D and FIGS. 2A-2B illustrate an example filter unit 10 that includes a body 1 forming an inlet 11 configured for intake of water and first and second outlets 12 and 13 that produce both filtered and unfiltered streams. In one embodiment, the filtered stream includes filtered water and the unfiltered stream is utilized to continuously flush particulate matter that collects within the filter unit 10. As schematically illustrated in FIG. 3, when outlet 12 is open (i.e., when filter unit 10 operates in a filtering mode), water is forced through a membrane 9 and filter element 7 to outlet 12. Conversely, as schematically illustrated in FIG. 4, when outlet 13 is open (i.e., when filter unit 10 operates in a flushing mode), water is forced along an outer surface of membrane 9 and to outlet 13.

During operation, unfiltered water is directed through inlet 11 and into a filter housing, formed of a lower or bottom case 2 and an upper or top case 6. The filter unit 10 can be mounted to a structure such as a cabinet through use of a mounting bracket 5. An inner sleeve 3 coupled with an inner tube 8 are positioned within the filter housing that together establish an initial flow path within the housing from the inlet 11. Nested within the sleeve 3 and tube 8 are a filter element 7 surrounded by a sheet or membrane 9 and a top sleeve 4 connected with the filter element 7. In one embodiment, the filter unit 7 and/or membrane 9 are replaceable. In particular, the lower case 2 and upper case 6 can be separated (e.g., through a threaded connection), where a used filter element 7 and membrane 9 can be removed and replaced by a new filter element 7 and membrane 9.

Figure 5:
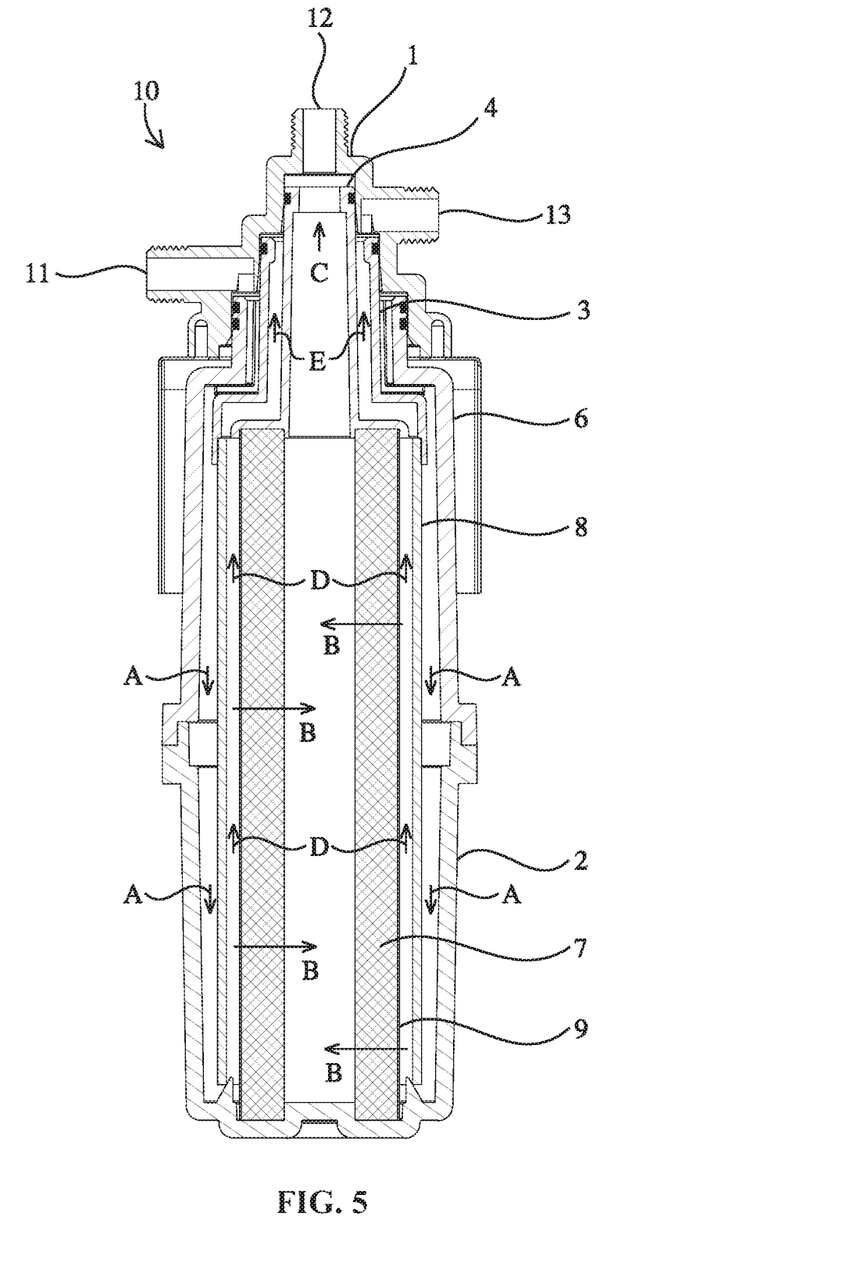
FIG. 5 is a schematic sectional view of operation of the filter unit of FIG. 1A.

With reference to FIG. 5, when both outlets 12 and 13 are closed, water is prevented from flowing through filter unit 10. During operation (i.e., when one of the outlets 12 or 13 are open), water entering inlet 11 is forced along sleeve 3 and down between tube 8 and cases 6 and 2 as indicated by arrows denoted with A. When outlet 12 is open, water is forced through path A and along a secondary path as indicated by arrows denoted with D and into membrane 9 and filter element 7 as indicated by arrows denoted with B. Next, water is forced through an inside of top sleeve 4 and to outlet 12 as indicated by arrows denoted with C. When filter unit 10 operates in the flushing mode, water travels between membrane 9 and an internal surface of tube 8, as indicated by arrows denoted with D. Next, water is forced between an internal surface of sleeve 3 and an outer surface of sleeve 4 as indicated by arrows denoted with E. Ultimately, water exits through outlet 13. Together, paths A and D create a circuitous path to direct water to the membrane 9 and filter unit 7

In one embodiment, filter element 7 is a carbon filter designed to adsorb chemical contaminants within water forced through the filter element 7. In other embodiments, the filter element 7 can be formed of a solid porous carbon block, loose granulated activated carbon or other materials as desired. The membrane 9 surrounding the filter element 7 can be formed of a suitable membrane material such as polyester or polyether sulfone. In another embodiment, the membrane can be formed of hollow fibers. To filter contaminants, the filter unit 10 in one embodiment includes two stages of filtration, a first stage including membrane 9 and a second stage including filter element 7. In one embodiment, the membrane 9 forms an exclusion surface that excludes particle of a particular size (e.g., 1 micron, 5 microns, 10 microns) from passing through the membrane 9. As a result, particulate matter excluded by the membrane 9 remains along an outer surface of the membrane 9. When outlet 12 is closed and outlet 13 is open, water is directed across the surface of the membrane 9. As it is passes across the surface of the membrane 9 (i.e., along path D), particles remaining on the surface 9 are flushed out of the housing through outlet 13. The flushing mode of filter unit 10 serves to continuously flush, rinse and clean out the filter housing and reduce exposure of filter element 7 to large particles. Accordingly, particle contaminants are prevented from building up in the filter element 7.

Figure 6:
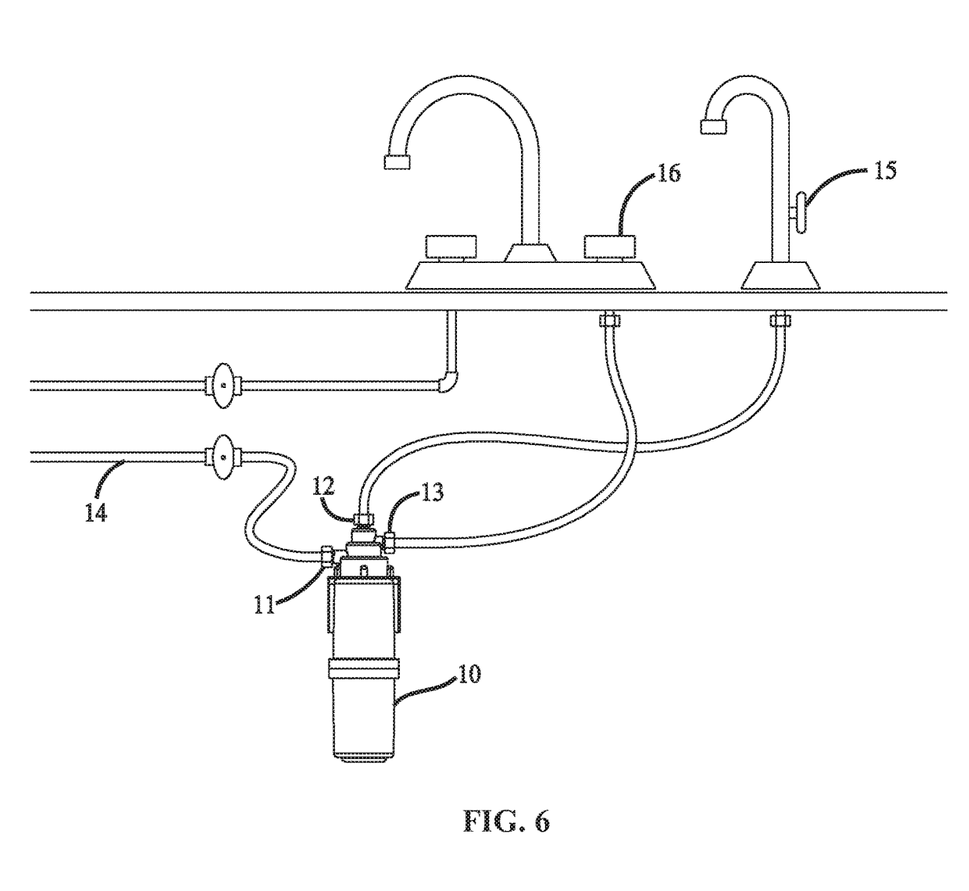
FIG. 6 is a schematic view of a tap system utilizing the filter unit of FIG. 1A.

FIG. 6 is a schematic diagram of filter unit 10 installed underneath a sink. Water flows along a supply line 14 to inlet 11 of the filter unit 10. Depending on a valve 15 or valve 16 that is open, water from the filter unit 10 exits either outlet 12 (if valve 15 is open) or outlet 13 (if valve 16 is open).

Figure 7:
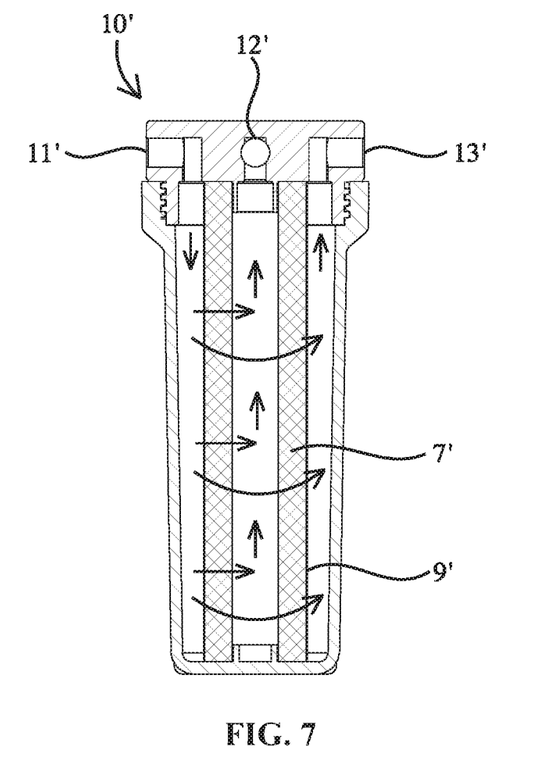
FIG. 7 is a schematic sectional view of operation of an alternative filter unit.

FIG. 7 is a schematic view of an alternative filter unit 10' that is similar in construction to filter unit 10. In filter unit 10', tube 8 has been removed. Accordingly, water enters through inlet 11' and is directly provided to membrane 9' and filter element 7'. If a filtered path is open, the water travels through membrane 9' and filter element 7' to outlet 12'. Alternatively, if a flushed path is open, water travels along an outer surface of membrane 9' and to outlet 13'.

Figure 8A:
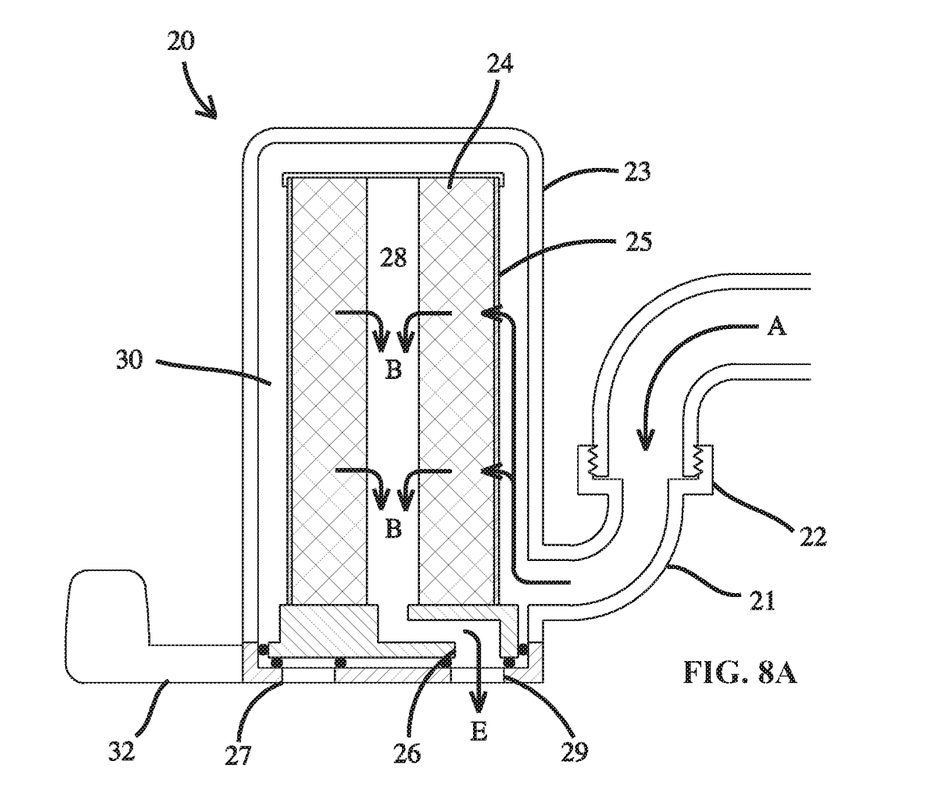
FIG. 8A is a schematic sectional view of operation of yet another alternative filter unit in a filtering mode.
Figure 8B:
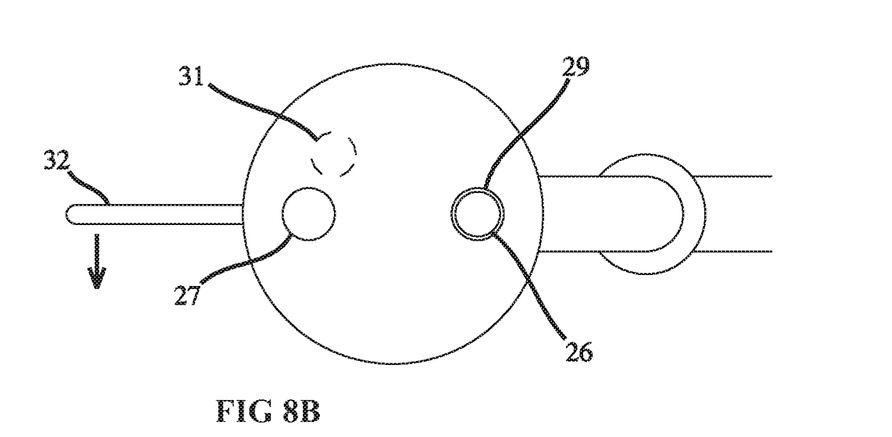
FIG. 8B is a schematic bottom plan view of the filter unit of FIG. 8A in the filtering mode.
Figure 9A:
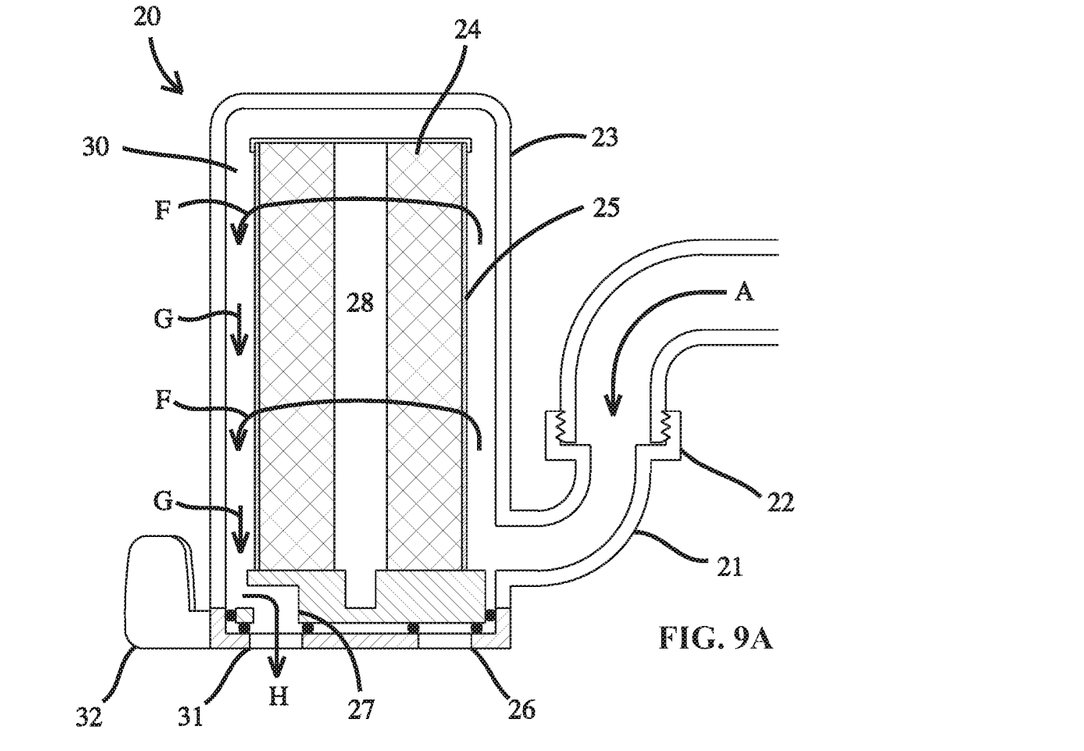
FIG. 9A is a schematic sectional view of operation of the filter unit of FIG. 8A in a flushing mode.
Figure 9B:
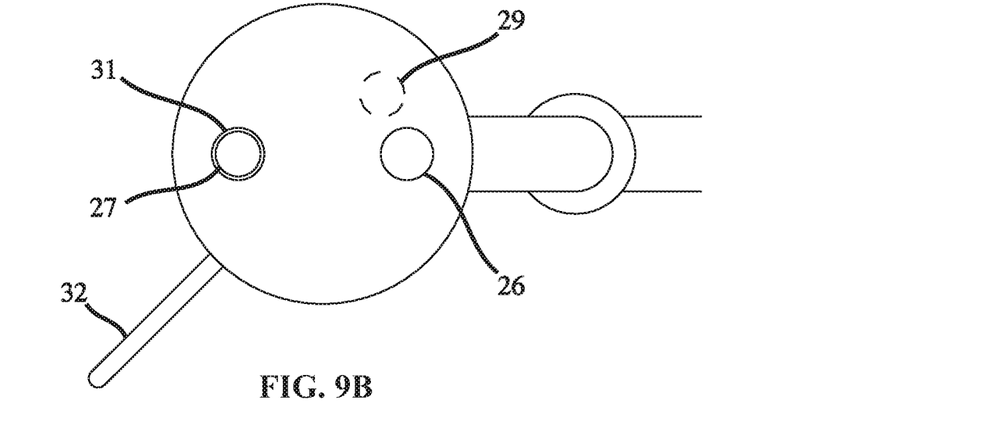
FIG. 9B is a schematic bottom plan view of the filter unit of FIG. 8A in the flushing mode.

FIGS. 8A and 8B are schematic illustrations of an alternative filter unit 20 in a filtering mode, whereas FIGS. 9A and 9B are schematic illustrations of the alternative filter unit 20 in a flushing mode. In contrast to filter unit 10, filter unit 20 includes an inlet 21 directly mounted to a faucet 22, as opposed to being mounted under a sink. Filter unit 20 includes a housing 23, a filter element 24, a membrane 25 surrounding the filter element 24 and first and second valves 26 and 27. Valves 26 and 27 are selectively opened through operation of a lever 32. During operation, water enters filter unit 20 through inlet 21, as indicated by an arrow denoted A. When valve 26 is open (when filter unit 20 is operating in the filtering mode) as illustrated in FIGS. 8A and 8B, water is forced through membrane 25 and filter element 24 into a central area 28, as indicated by arrows denoted B. Water then flows through valve 26 and out of the housing 23 through an outlet 29, as indicated by arrow E. Conversely, when valve 27 is open (when filter unit 20 is operating in the flushing mode) as illustrated in FIGS. 9A and 9B, water flows around the membrane 25 as indicated by arrows F. This flow flushes water around the membrane 25 and out through a space 30 provided between the filter element 24 and an interior surface of the housing, as indicated by arrows denoted G. Ultimately, this water then travels through valve 27 and through an outlet 31, as indicated by an arrow denoted H.

Another optional feature for the filter units described herein includes a visual indicator that indicates water flowing across the membrane of the filter unit. For example, a window or transparent or partially transparent housing can indicate that water is flowing within the filter unit. Alternatively, or in addition thereto, strings, vanes, wheels or other elements can be positioned on an exterior of the housing to indicate water flow within the filter unit.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A water filtration system having a first valve of a first faucet associated with a sink, a second valve of a second faucet associated with the sink and a filter unit having a housing and a body, the housing including a first end and a second end, the body separately connectable to the first end and including an inlet, a first outlet and a second outlet, the housing defining a first fluid path positioned to direct pressurized water from the inlet through a membrane from an outer membrane surface to an inner membrane surface and to a filter element to the first outlet when the first valve is in an open position, wherein the inner membrane surface is formed onto and faces an outer filter surface of the filter element, the housing defining a second fluid path positioned to direct pressurized water from the inlet along the outer surface of the membrane to the second outlet when the second valve is in an open position.

2. The water filtration system of claim 1, wherein the filter element is a carbon block.

3. The water filtration system of claim 1, wherein the filter element includes a chemical adsorption layer positioned to adsorb chemicals from the unfiltered water.

4. The water filtration system of claim 1, further comprising a tube positioned within the housing, the tube including an outer tube surface and an inner tube surface, the tube positioned to direct water from the inlet along the housing and the outer tube surface, through a circuitous path and along the inner tube surface and the outer surface of the membrane.

5. The water filtration system of claim 1, wherein the filter unit is configured to be installed remote from a faucet fluidly coupled with the filter unit.

6. The water filtration system of claim 1, wherein the filter unit is installed directly to a faucet fluidly coupled with the filter unit.

7. The water filtration system of claim 1, wherein the membrane forms an exclusion layer.

8. The water filtration system of claim 1, wherein the membrane is formed of a polymeric material.

9. The water filtration system of claim 1, wherein the outer surface of the membrane faces the housing.

10. The water filtration system of claim 1, where the membrane is formed of hollow fibers.

11. The water filtration system of claim 1, wherein the filter element is a solid porous carbon block.

12. The water filtration system of claim 1, wherein the filter element is formed of a chemical adsorption layer positioned to adsorb chemicals from the unfiltered water.

13. The water filtration system of claim 1, wherein the filter element includes loose granulated activated carbon.

14. The water filtration system of claim 1, wherein the filter element is replaceable by separating portions of a housing and replacing the filter element with a new filter element.

15. The water filtration system of claim 1, wherein the second fluid path excludes the filter.

16. A method of operating a filtration system having a filter element and a membrane contained within a housing connected with a body, the housing including a first end and a second end, the body separately connectable to the first end and including an inlet, a first outlet and a second outlet, the method comprising, operating in a filtering mode by directing water from the inlet along a first fluid path from an outer membrane surface through the membrane to an inner membrane surface, the filter element and the first outlet when a first valve is in an open position, operating in a flushing mode by directing water along a second fluid path that includes the outer membrane surface and the second outlet, wherein the second fluid path excludes the filter element when a second valve is in an open position, and directing water from the first outlet to the first faucet associated with a sink and directing water from the second outlet to a second faucet associated with the sink.

17. The method of claim 16, wherein the membrane is formed onto an outer surface of the filter element.

18. The method of claim 16, further comprising directing water through a circuitous path within the housing.

19. The method of claim 16, wherein the first fluid path and the second fluid path are contained within the housing.

* * * * *

UNITED STATES PATENT AND TRADEMARK OFFICE
CERTIFICATE OF CORRECTION

PATENT NO. : 11,571,642 B2
APPLICATION NO. : 15/977687
DATED : February 7, 2023
INVENTOR(S) : Jeffrey Sandahl Page 1 of 1

It is certified that error appears in the above-identified patent and that said Letters Patent is hereby corrected as shown below:

On the Title Page

Item (12) delete "Sandahi," and insert -- Sandahl, --.

Item (71) (Applicant), Line 1, delete "Sandahi," and insert -- Sandahl, --.

Item (72) (Inventor), Line 1, delete "Sandahi," and insert -- Sandahl, --.

In the Claims

In Claim 16, Column 4, Line 66, delete "comprising," and insert -- comprising: --.

In Claim 16, Column 5, Line 8, delete "to the" and insert -- to a --.

Signed and Sealed this
Twenty-seventh Day of August, 2024

Katherine Kelly Vidal
*Director of the United States Patent and Trademark Office*